United States Patent
Bareel et al.

(10) Patent No.: US 7,226,215 B2
(45) Date of Patent: Jun. 5, 2007

(54) OPTICAL FIBER CONNECTOR

(75) Inventors: Baudouin Bareel, Brussels (BE); Peter D'hondt, Lebreke (BE)

(73) Assignee: Nexans, Paris (FR)

( * ) Notice: Subject to any disclaimer, the term of this patent is extended or adjusted under 35 U.S.C. 154(b) by 0 days.

(21) Appl. No.: 11/190,192

(22) Filed: Jul. 25, 2005

(65) Prior Publication Data
US 2006/0018604 A1 Jan. 26, 2006

(30) Foreign Application Priority Data
Jul. 26, 2004 (FR) .................................. 04 51650

(51) Int. Cl.
*G02B 6/38* (2006.01)
*G02B 6/36* (2006.01)
(52) U.S. Cl. ...................... 385/84; 385/60; 385/62; 385/72; 385/78; 385/81
(58) Field of Classification Search ................. 385/90, 385/78, 81, 84, 60, 62, 72
See application file for complete search history.

(56) References Cited
U.S. PATENT DOCUMENTS 5,394,497 A * 2/1995 Erdman et al. ............... 385/78
5,734,770 A * 3/1998 Carpenter et al. ............ 385/72
5,809,192 A * 9/1998 Manning et al. .............. 385/78
6,179,482 B1 * 1/2001 Takizawa et al. ............. 385/81
6,722,790 B2 * 4/2004 Caveney ...................... 385/81
2004/0151437 A1 * 8/2004 Marrs et al. .................. 385/78
2005/0036744 A1 * 2/2005 Caveney et al. .............. 385/87
2005/0213892 A1 * 9/2005 Barnes et al. ................ 385/62

* cited by examiner

*Primary Examiner*—Michelle Connelly-Cushwa
*Assistant Examiner*—Rhonda S. Peace
(74) *Attorney, Agent, or Firm*—Sofer & Haroun, LLP

(57) ABSTRACT

The invention relates to an optical fiber connector comprising a ferrule disposed in a connector body and receiving the optical fiber in a longitudinal bore, said ferrule being subjected to a compression spring disposed on a part extending the ferrule, referred to as a "counter-ferrule", and pressed by a closure part secured to said connector body. According to the invention, the ferrule and the counter-ferrule are constituted by two separate parts, and an optical fiber holder element is inserted between these two separate parts, said holder element being capable of being caused to hold the optical fiber from outside the connector, and said holder element is also capable of being released from outside the connector.

8 Claims, 4 Drawing Sheets

OPTICAL FIBER CONNECTOR

RELATED APPLICATIONS

The present invention is related to and claims the benefit of priority from French Patent Application No. 04 51650, filed on Jul. 26, 2004, the entirety of which is incorporated herein by reference.

FIELD OF THE INVENTION

The invention relates to an optical fiber connector.

More particularly, the invention relates to an optical fiber connector comprising a first part known as a "ferrule" disposed in a connector body and receiving the optical fiber in a longitudinal bore, said ferrule being subjected to a compression spring disposed on a part extending the ferrule, referred to as a "counter-ferrule", and pressed by a closure part secured to said connector body.

BACKGROUND OF THE INVENTION

Such an arrangement is described in patent document EP 0 864 887.

According to that prior art document, the ferrule and the counter-ferrule are made as a single piece and the optical fiber is generally stuck in the bore of the ferrule in order to hold it in position. It is also known to hold the optical fiber in position by crimping the ferrule.

Those means for holding the optical fiber pose the following technical problems.

When using an adhesive, a certain length of time is necessary for the adhesive to set, whether the adhesive is hardened in an oven or chemically by means of an additive.

When using crimping, it is necessary for an operator having crimping pliers to perform this operation in quite precise manner.

In either case, mounting requires additional assembly equipment, e.g. adhesive, an oven, or pliers, and mounting the optical fiber in the connector turns out to be quite complex and difficult.

Furthermore, holding the fiber by adhesive or by crimping is final and cannot under any circumstances be undone; once the optical fiber is held in this way in the ferrule, it cannot be released and removed from the connector.

OBJECTS AND SUMMARY OF THE INVENTION

The invention solves these technical problems, and to do so it proposes an optical fiber connector comprising a ferrule disposed in a connector body and receiving the optical fiber in a longitudinal bore, said ferrule being subjected to a compression spring disposed on a part extending the ferrule, referred to as a "counter-ferrule", and pressed by a closure part secured to said connector body, wherein the ferrule and the counter-ferrule are constituted by two separate parts, and an optical fiber holder element is inserted between these two separate parts, said holder element being capable of being caused to hold the optical fiber from outside the connector, and wherein said holder element is also capable of being released from outside the connector.

A connector is thus obtained that is ready for mounting the optical fiber without needing difficult operations and without requiring additional special equipment.

Unlike certain devices consisting in a mechanical connection between a piece of fiber previously stuck and polished in the ferrule and the cable fiber for connection, which presents the disadvantage of an additional junction and thus of additional attenuation, the invention presents the advantage of the fiber being held mechanically without leading to additional attenuation due to a mechanical joint inside the connector.

The term "optical fiber" is used broadly in the present specification. It may be a bare optical fiber or a sheathed fiber. It may be a glass fiber or a polymer fiber.

Furthermore, by means of the invention, it is possible to release the optical fiber without complex disassembly of the connector. The connector in accordance with the invention can be reused after separating a fiber.

In a preferred embodiment, said holder element is active under the action of said compression spring.

Preferably, said holder element operates by pressing against the optical fiber.

Advantageously, said two separate parts are constituted by a ferrule constituted by a cylindrical part having an annular end flange, and by a counter-ferrule constituted by a cylindrical part having an annular end flange facing towards the flange of the ferrule.

In a first variant, said holder element is constituted by a cylindrical sleeve of elastic material inserted in a cylindrical cavity of the ferrule, and designed to have said annular flange of the counter-ferrule pressed thereagainst.

In a second variant, said holder element is constituted by two frustoconical half-sleeves inserted in a conical cavity of the ferrule and is designed to have said annular flange of the counter-ferrule pressed thereagainst.

Preferably, the connector includes a removable retaining arrangement for retaining the counter-ferrule outside said closure part against the force of said spring.

Advantageously, said retaining arrangement is constituted by a clip releasably engaged in a groove formed in the counter-ferrule.

Advantageously, said clip is constituted by a symmetrical blade comprising a central clip ring between two grip branches.

BRIEF DESCRIPTION OF THE DRAWINGS

The invention is described below in greater detail with the help of figures merely showing preferred embodiments of the invention.

MORE DETAILED DESCRIPTION

Figure 1:
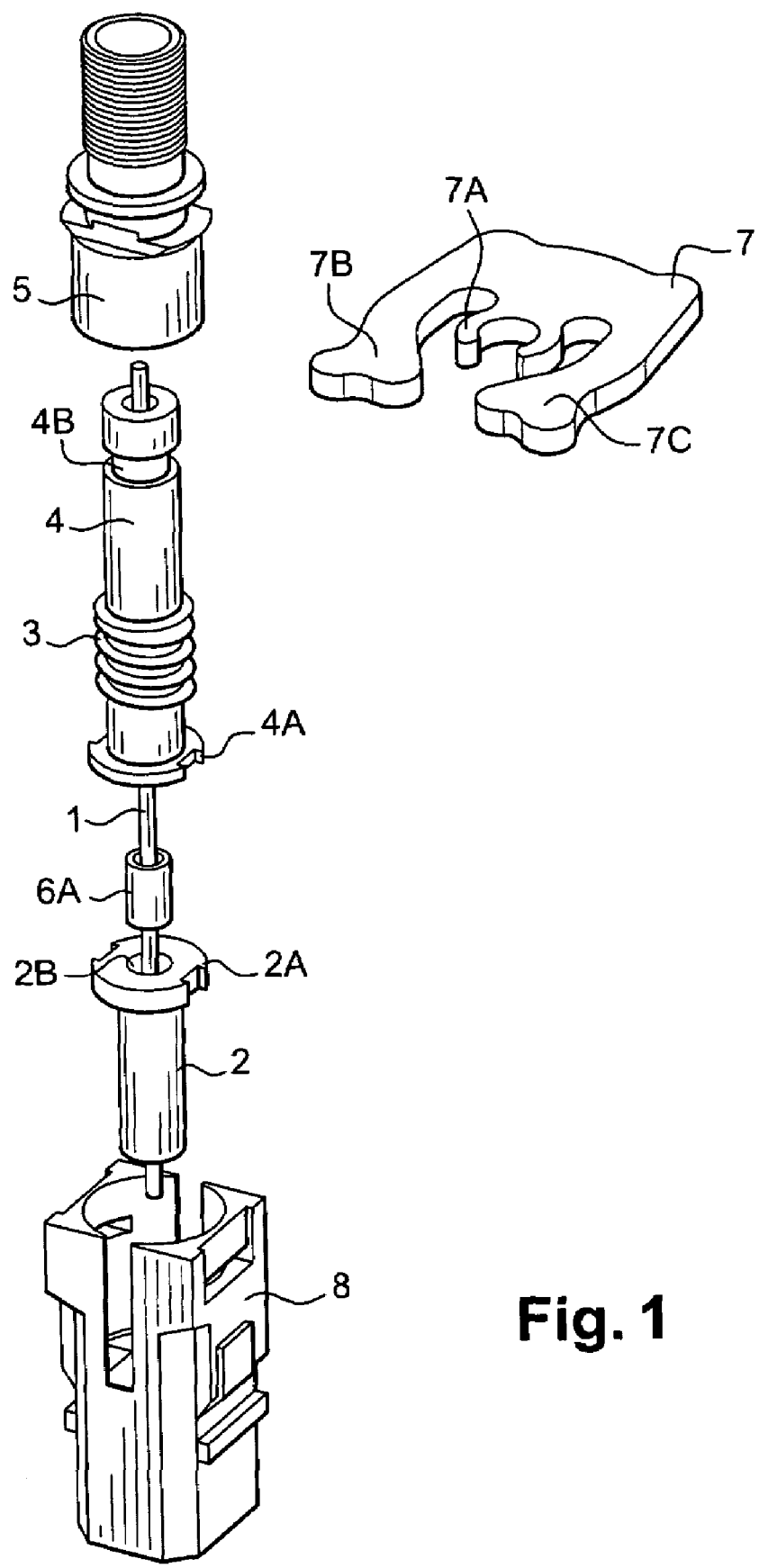
FIG. 1 is an exploded perspective view of a connector in accordance with the invention in a first embodiment.

A first embodiment of a connector is shown in an exploded perspective view in FIG. 1, enabling the various component parts of the connector to be visualized.

This preassembled optical fiber connector comprises a ferrule 2, e.g. made of ceramic material or of metal, placed in a connector body 8, e.g. made of plastics material, and receiving the optical fiber 1 in a longitudinal bore. The ferrule 2 is subjected to a compression spring 3 disposed on a part 4 extending the ferrule, referred to as a "counter-ferrule", e.g. made of plastics material or of metal, and pressed by a closure part 5, e.g. made of metal, that is secured to said connector body.

The ferrule 2 and the counter-ferrule 4 are constituted by two separate parts, and an optical fiber holder element 6A is inserted between these two separate parts, this holder element being suitable for being caused to hold the fiber from outside the assembled connector, as explained below.

The first and known function of the compression spring 3 in this type of connector is to urge the ferrule in such a manner that when the two ferrules of two connectors are placed end to end they come into contact with resilient compression thrust.

Most advantageously, in the invention, the holder element is active under the action of the same compression spring 3.

More precisely, these two separate parts are constituted by a ferrule 2 constituted by a cylindrical part having an annular end flange 2A, and by a counter-ferrule 4 constituted by a cylindrical part having an annular end flange 4A facing towards the flange of the ferrule 2.

The holder element 6A acts by pressing against the optical fiber 1.

In this first embodiment, the holder element is constituted by a cylindrical sleeve 6A of elastic material, advantageously elastomer material, inserted in a cylindrical cavity 2B in the ferrule and designed to have the annular flange 4A of the counter-ferrule pressed thereagainst.

The diameter of the cavity 2B is substantially equal to the diameter of the sleeve, and its depth is shorter than the length of the sleeve.

The connector also comprises a clip 7 for releasably engaging in a groove 4B arranged in the counter-ferrule 4. This clip 7 is constituted by a symmetrical blade comprising a central clip ring 7A surrounded by two grip branches 7B and 7C.

Figure 2:
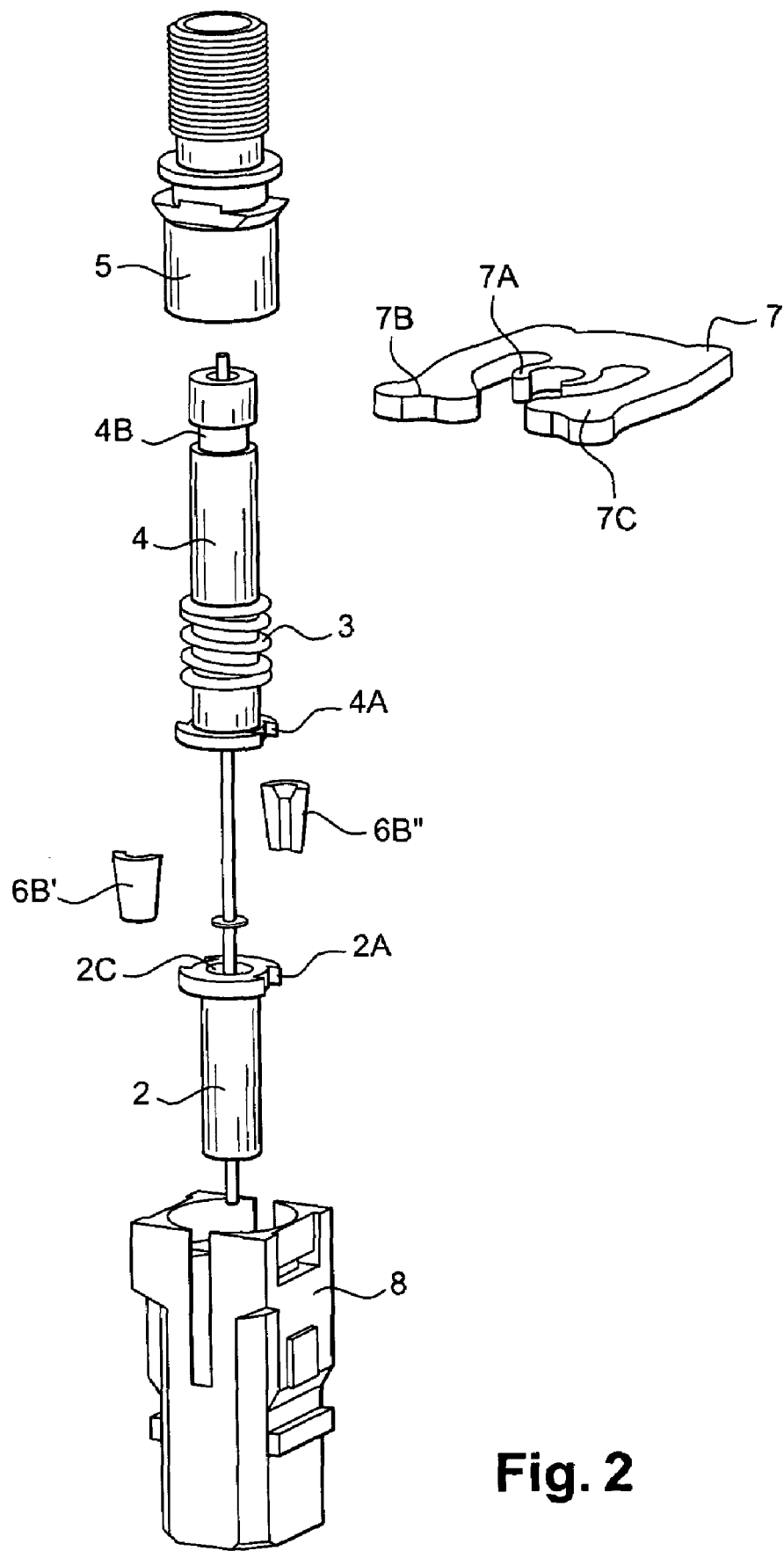
FIG. 2 is an exploded perspective view of a connector in accordance with the invention in a second embodiment.

A connector in a second embodiment is shown in an exploded perspective view in FIG. 2, and parts that are identical to those in the first embodiment are referenced identically.

This other embodiment differs by the holder element for holding the optical fiber 1 being of a different structure. In this case, it is constituted by two frustoconical half-sleeves 6B', 6B", preferably made of a plastics material such as acrylonitrile-butadiene-sytrene (ABS) copolymer, inserted around the optical fiber 1 in a conical cavity 2C of the ferrule and being designed to have the annular flange 4A of the counter-ferrule pressed thereagainst.

Figure 3:
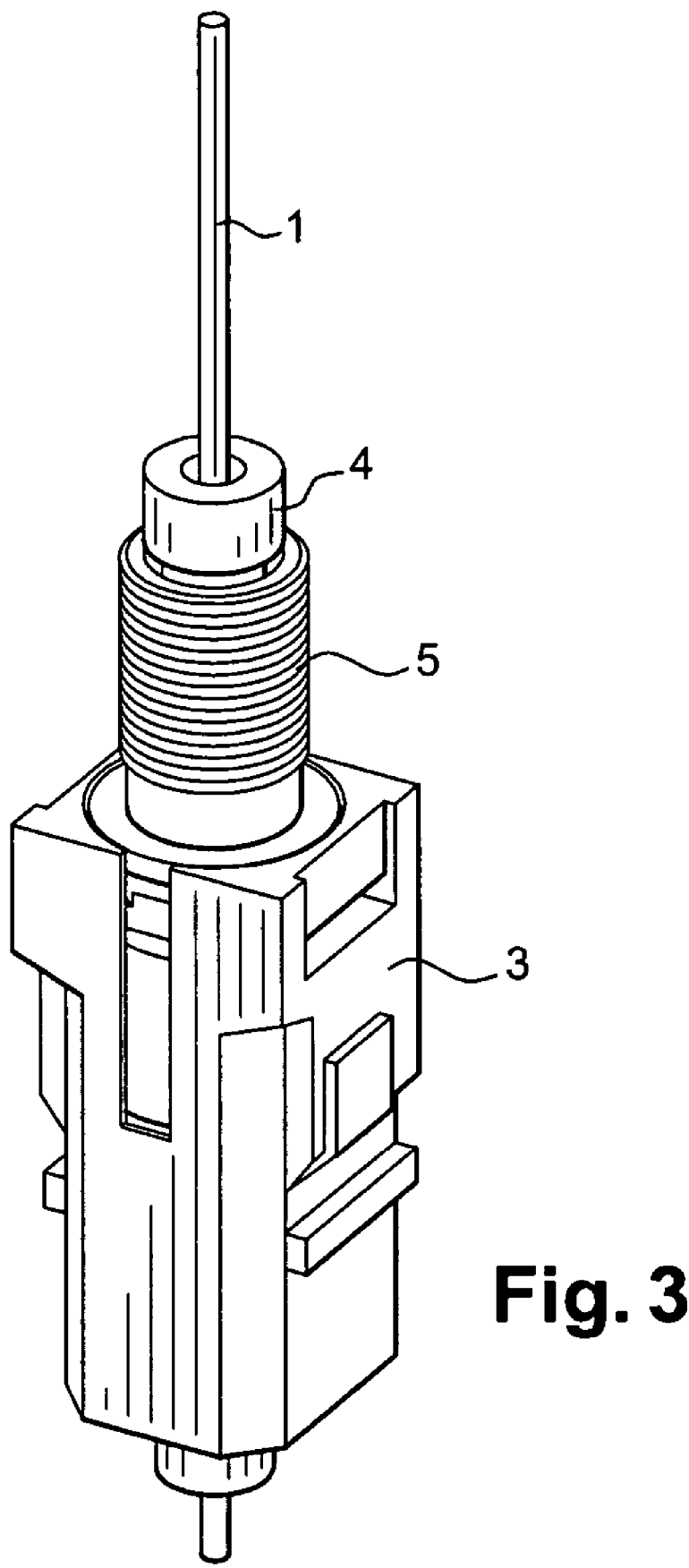
FIG. 3 is a perspective view of a connector in accordance with the invention, with the optical fiber being held in position.

FIG. 3 is a perspective view of a connector of the invention, once its component parts have been assembled together and with the optical fiber being held in position.

The way in which the parts are mounted and relatively positioned is described with reference to the following figures. The ferrule 2, the holder element 6, a portion of the counter-ferrule 4, and a portion of the closure part 3 are contained and held in the connector body 8.

This assembly is performed in a manner explained with reference to the following figures in longitudinal section view.

Figure 4:
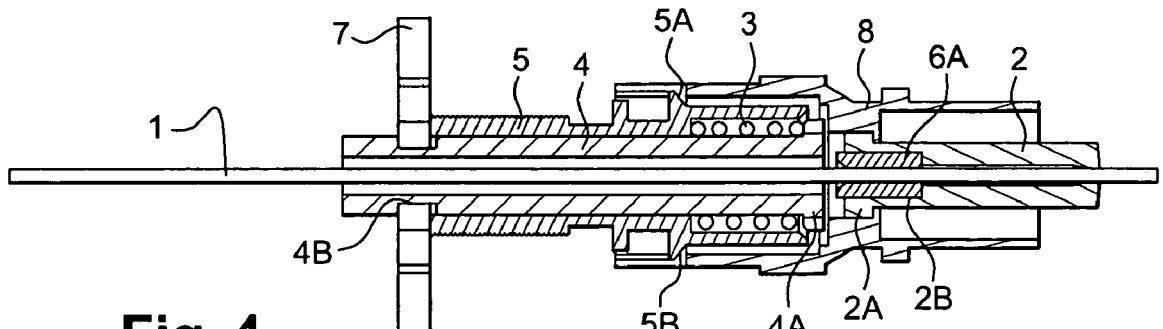
FIG. 4 is a longitudinal section view of the connector shown in FIG. 3, in the first embodiment.
Figure 6:
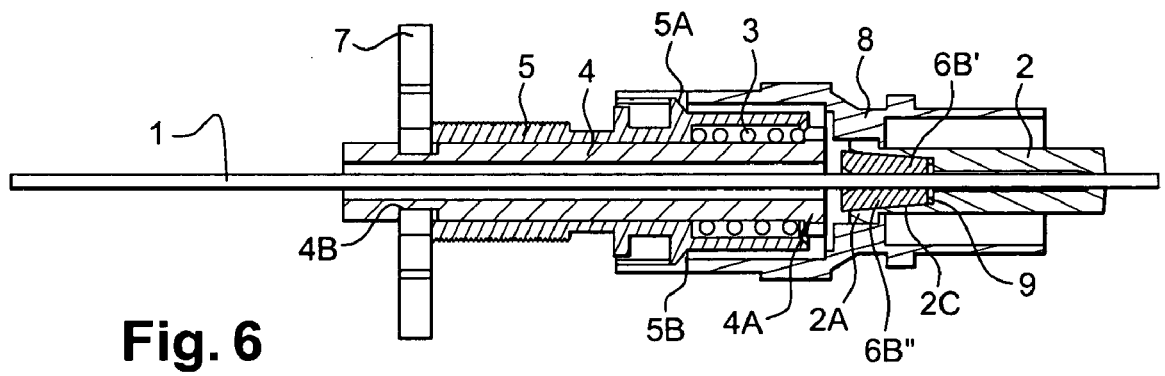
FIG. 6 is a longitudinal section view of the connector shown in FIG. 3, in the second embodiment.

FIG. 4 shows the first embodiment, and FIG. 6 shows the second embodiment, both with the connector having an optical fiber 1 that is not held in position.

It should be observed that in general, in spite of being drawn horizontally, the component parts are assembled together vertically in practice, i.e. as shown in FIGS. 1 and 2. Putting them into place in the connector body 8 is thus made easier by gravity.

The ferrule 2 is inserted into the connector body 8 and is prevented from turning relative thereto by a rib-and-groove arrangement in its annular flange 2A. The holder element 6 is put into place in the right cylindrical or conical cavity 2B or 2C, which element is constituted either by the cylindrical sleeve 6A or by the two frustoconical half-elements 6B' and 6B". The counter-ferrule 4 fitted with the spring 3 is put into place in the body 8 of the connector, and is likewise prevented from turning by a rib-and-groove arrangement in its annular flange 4B. The closure part 5 compresses the spring 3 and is held on the connector body 8 by snap-fastening 5A, 5B, while still allowing the outside end of the counter-ferrule 4 to pass through.

In FIGS. 4 and 6, the fiber 1 passing through a longitudinal orifice of the ferrule 2 and of the counter-ferrule 4 is not yet held in position.

To do this, the clip 7 acts as a releasable retaining arrangement for the counter-ferrule 4 outside the closure part 5 against the force of the spring 3, and it is clipped into the groove 4B of the counter-ferrule. This groove 4B is placed in such a manner that while in this position, the end annular flanges 2A and 4B of the ferrule and of the counter-ferrule are spaced apart. The cylindrical sleeve 6A or the half-elements 6B', 6B" are thus merely placed in the corresponding cavity 2B or 2C, without having any effect on the fiber 2.

Figure 5:
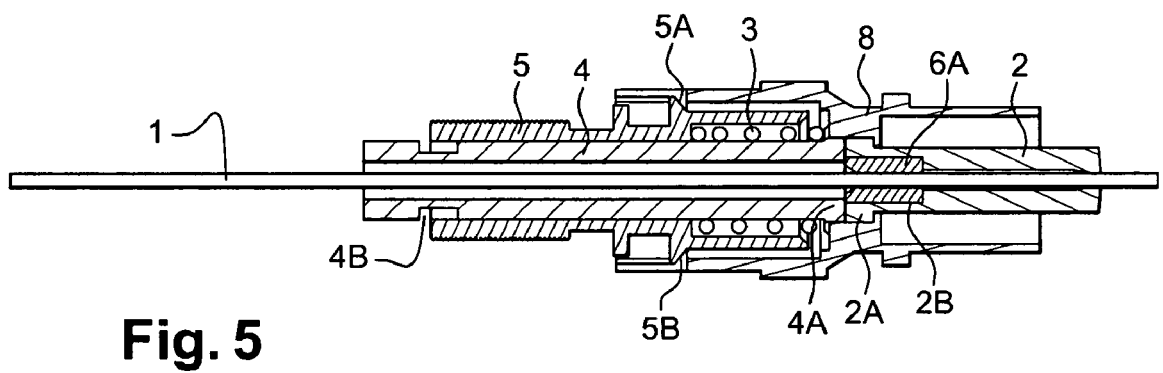
FIG. 5 is a longitudinal section view of the same connector, the optical fiber being in the released position.

By removing and unclipping the clip 7, which is made easier by its grip or thrust portions 7B, 7C, as shown in FIG. 5 or the first embodiment, the counter-ferrule 4 is released, is subjected to the effect of the spring 3, and is urged under thrust towards the ferrule 2 against the cylindrical sleeve 6A which, because of its own elasticity, becomes compressed in the corresponding cavity and clamps against the optical fiber 1 by deforming, until the annular flange 4A of the counter-ferrule comes into abutment against the annular flange 2A of the ferrule. The optical fiber 1 is then held in position and the connector is in its operating position, as shown in FIG. 3.

Figure 7:
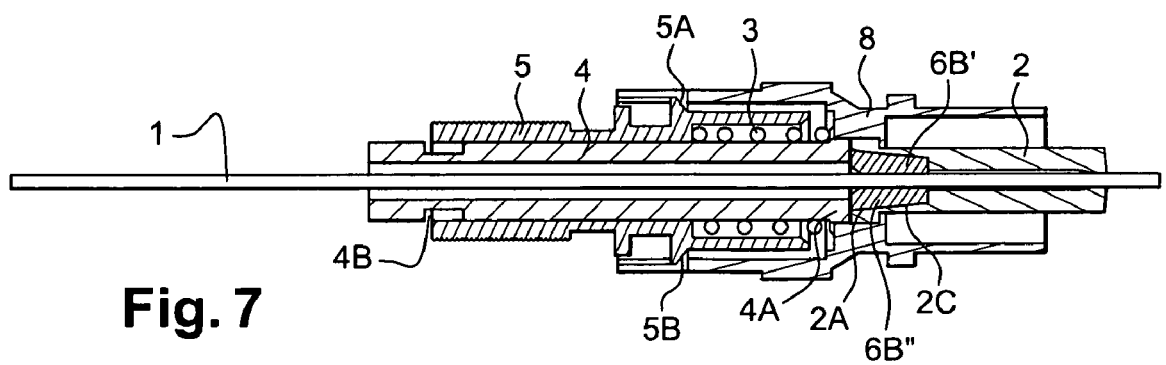
FIG. 7 is a longitudinal section view of the same connector, the optical fiber being in the released position.

Similarly, by removing and unclipping the clip 7, made easier by its grip or thrust portions 7B, 7C, and as shown in FIG. 7, relating to the second embodiment, the ferrule 4 is released, is subjected to the effect of the spring 3, and is urged under thrust towards the ferrule 2 against the frustoconical half-elements 6B' and 6B", which are pushed into the corresponding conical cavity 2C, and due to their own wedging conical shape they clamp against the optical fiber 1 until the annular flange 4A of the counter-ferrule comes into abutment against the annular flange 2A of the ferrule. The optical fiber 1 is then held in position and the connector is in its operating position, as shown in FIG. 3.

The optical fiber is thus put into place in the connector by an operation that is particularly simple, and does not require any special additional equipment.

In addition to mounting being particularly easy, another important characteristic of the invention should be observed. The invention also makes it easy to disassemble and release the optical fiber while acting on the outside of the connector, and without requiring special action to be taken on the assembled connector.

With the connector mounted as shown in FIGS. 3, 5, and 7, part of the groove 4B of the counter-ferrule remains on the outside and can be used as a point for gripping by hand or by means of a tool in order to pull the counter-ferrule 4 towards the outside against the force of the spring 3. The clip 7 can then be clipped on said groove and the optical fiber is released either by releasing the cylindrical sleeve 6A or by releasing the frustoconical half-elements 6B' and 6B".

In the second embodiment, and as shown in FIG. 6, an elastic ring 9, preferably made of elastomer, is preferably inserted in the bottom of the conical cavity 2C of the ferrule to make it easier for the frustoconical half-elements 6B' and 6B" to be moved out from the conical cavity 2C by said ring expanding elastically.

The embodiments described above and shown relate to a connector commonly referred to as an SC connector. Naturally, the invention can also be applied to any other type of connector for optical fibers, in particular connectors better known under the references LC, MTRF, ST, and FC.

What is claimed is:

1. An optical fiber connector comprising: a ferrule disposed in a connector body and receiving the optical fiber in a longitudinal bore, said ferrule being subjected to a compression spring disposed on a part extending the ferrule, referred to as a "counter-ferrule", and pressed by an independent closure body secured to said connector body, wherein the ferrule and the counter-ferrule are constituted by two separate parts, and an optical fiber holder element is inserted between these two separate parts, said holder element being capable of being caused to hold the optical fiber from outside the connector, and wherein said holder element is also capable of being released from outside the connector by means of a separate removable retaining element for retaining the counter-ferrule outside said closure part against the force of said spring.

2. A connector according to claim 1, wherein said holder element is active under the action of said compression spring.

3. A connector according to claim 1, wherein said holder element operates by pressing against the optical fiber.

4. A connector according to claim 1, wherein said two separate parts are constituted by a ferrule constituted by a cylindrical part having an annular end flange, and by a counter-ferrule constituted by a cylindrical part having an annular end flange facing towards the flange of the ferrule.

5. A connector according to claim 4, wherein said holder element is constituted by a cylindrical sleeve of elastic material inserted in a cylindrical cavity of the ferrule, and designed to have said annular flange of the counter-ferrule pressed thereagainst.

6. A connector according to claim 4, wherein said holder element is constituted by two frustoconical half-sleeves inserted in a conical cavity of the ferrule and is designed to have said annular flange of the counter-ferrule pressed thereagainst.

7. An optical fiber connector comprising: a ferrule disposed in a connector body and receiving the optical fiber in a longitudinal bore, said ferrule being subjected to a compression spring disposed on a part extending the ferrule, referred to as a "counter-ferrule", and pressed by an independent closure body secured to said connector body, wherein the ferrule and the counter-ferrule are constituted by two separate parts, an optical fiber holder element is inserted between these two separate parts, said holder element being capable of being caused to hold the optical fiber from outside the connector, and wherein said holder element is also capable of being released from outside the connector, and a removable retaining arrangement is provided for retaining the counter-ferrule outside said closure part against the force of said spring, said retaining arrangement being constituted by a clip releasably engaged in a groove formed in the counter-ferrule.

8. A connector according to claim 7, wherein said clip is constituted by a symmetrical blade comprising a central clip ring between two grip branches.

* * * * *